United States Patent
Mishra et al.

(10) Patent No.: US 12,046,260 B2
(45) Date of Patent: Jul. 23, 2024

(54) ARCHITECTURE FOR PERSONALIZED MEDIA SEGMENTATION

(71) Applicant: Spotify AB, Stockholm (SE)

(72) Inventors: Manish Mishra, Berlin (DE); Radek Miazio, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/050,153

(22) Filed: Oct. 27, 2022

(65) Prior Publication Data

US 2024/0144977 A1    May 2, 2024

(51) Int. Cl.
*G11B 27/036*     (2006.01)
*G06F 16/2457*    (2019.01)

(52) U.S. Cl.
CPC ...... *G11B 27/036* (2013.01); *G06F 16/24573* (2019.01)

(58) Field of Classification Search
CPC .................... G11B 27/036; G06F 16/24573
See application file for complete search history.

(56) References Cited

U.S. PATENT DOCUMENTS

| | | | |
|---|---|---|---|
| 10,834,158 B1 * | 11/2020 | Bourgoyne | H04N 21/4825 |
| 10,887,671 B2 | 1/2021 | Garmark et al. | |
| 10,911,815 B1 | 2/2021 | McCarthy et al. | |
| 2011/0307924 A1 | 12/2011 | Roberts et al. | |
| 2013/0097634 A1 * | 4/2013 | Jin | G11B 27/28 |
| | | | 725/34 |
| 2015/0206168 A1 | 7/2015 | Boggs et al. | |
| 2015/0293928 A1 | 10/2015 | Chen et al. | |
| 2018/0225676 A1 | 8/2018 | Yruski et al. | |
| 2018/0367823 A1 * | 12/2018 | Brinkley | H04N 21/8456 |
| 2020/0413163 A1 | 12/2020 | Aher et al. | |

FOREIGN PATENT DOCUMENTS

| | | |
|---|---|---|
| WO | 2008128037 | 10/2008 |
| WO | 2009045560 | 4/2009 |

OTHER PUBLICATIONS

Steadman, Mark, "Grow Your Business with DAI", published Feb. 9, 2022, obtained Mar. 28, 2023 online at: https://origin.fm/blog/dai/, 7 pages.

* cited by examiner

*Primary Examiner* — Albert M Phillips, III
(74) *Attorney, Agent, or Firm* — Merchant & Gould P.C.

(57) ABSTRACT

Methods, systems and computer program products are provided for performing personalization. A segments reader receives a request for episode metadata corresponding to an episode. A determination is made whether the episode metadata should be personalized to an account associated with the request. In turn, personalized-episode metadata associated with the account and the request is retrieved and the personalized-episode metadata is provided to a client device associated with the request.

21 Claims, 5 Drawing Sheets

ARCHITECTURE FOR PERSONALIZED MEDIA SEGMENTATION

TECHNICAL FIELD

Example aspects described herein relate generally to content distribution systems, and more particularly to systems, methods and computer products for providing personalized media segmentation.

BACKGROUND

Modern day media delivery systems operate to provide different types of media content to client devices. The media content may include music, podcasts, videos, games, books, text, and the like, as well as webpage content, advertisements, professionally and non-professionally generated content, search results, blogs, and the like. In some implementations, playlists are provided to the client devices which, in turn, use the playlists to retrieve media content items by streaming or downloading them. A typical playlist contains lists of links that are used to retrieve corresponding media content items (e.g., a music content item, a video content item, a textual content item, etc.) from the media delivery system. This enables the types of content to be mixed by hardcoding a list of media content items into the playlist.

Typical music-talk shows and podcasts, for example, enable a content provider to generate an episode of the show by selecting particular music tracks to go along with the talk portion. Similarly, the talk portion of an episode can consist of individual segments, allowing the content provider to mix particular talk segments with a variety of music tracks.

Listeners may not enjoy the selections made by the content creator, however. Consequently, the content provider must generate more episodes (or entirely new shows) to target more listeners.

One existing solution to this problem involves providing playlists that consist of episode talk segments and media tracks, where the media content items are personalized for each user are selected from a recommendation system. While this solution has been successful in providing personalized shows there is still room for improvement, for example, in connection with generating more desirable and pertinent personalized content and with regard to enabling content providers and their content consumers new and useful features.

One limitation in connection with typical playlists with personalized talk content is that spoken sections that form a part of a playlist are typically released onto a distribution platform as part of different (e.g., podcast) shows. This makes consuming such content more challenging as the content segments are spread across various episodes or shows. Existing content generation and delivery systems and client applications also make navigating to different content relatively difficult because personalized playlists have different links to the content for every user. In addition, there is currently no feature that allows a user to follow a personalized playlist and be notified about changes made to it, making it difficult to know when new content is released. Moreover, when new content is released, the previous playlist is lost with no history of the media objects it contained.

SUMMARY

Aspects of the present invention provide content creators with the ability to create an episode that matches the taste profiles of many types of users. This is accomplished by dynamically injecting one or more media content items (e.g., an audio item, a video item, one or more animated and/or static images, a text item, etc.) into the episode of the show, where media content items are based on individual user taste profiles. Aspects of the embodiments also enable content creators to still influence the media content item selection by specifying a source of content. The specified source defines a pool of media content where specific media content items should be selected from.

Generally, a client device issues a request associated with an episode. A segments reader receives the request and causes media content items that are personalized for a user to be injected into the episode defined by the creator.

In some embodiments, the request contains data enabling a component of a media delivery system to retrieve segments corresponding to an episode of a show in the form of segment metadata. The request particularly includes various items of segment data associated with multiple types of content (e.g., talk content, music content, video content, text content, etc.). The items of data corresponding to the segments, are, in turn, used to generate a personalized media segment that forms part of an episode.

In some embodiments, certain segments are personalized according to an account associated with the personalization request. In some embodiments, the personalized segments can be prestored in a database configured to store personalized data for ease of retrieval and historical purposes.

In some embodiments personalized segments are not prestored. In such cases, a recommendation request can be issued to a recommendation system to retrieve personalized segments in the form of personalized-segment metadata (also referred to simply as personalized segment data). In addition, the personalized-segment metadata can be stored to enable faster retrieval as well as to enable saving the history of previously generated personalized episodes.

In an example embodiment, a method for performing personalization involves receiving, e.g., by a segments reader, a request for episode metadata corresponding to an episode; determining (e.g., by a personalization service) the episode metadata should be personalized to an account associated with the request; retrieving personalized-episode metadata associated with the account and the request; and providing the personalized-episode metadata to a client device associated with the request.

In some embodiments, the method further involves determining a personalized-segments database contains personalized-segment metadata corresponding to the request; and injecting the personalized-segment metadata into the personalized-episode metadata.

In some embodiments, the method further involves determining a personalized-segments database does not contain personalized-segment metadata; obtaining, from a recommendation system, personalized-segment metadata; injecting the personalized-segment metadata into the personalized-episode metadata; and storing the personalized-segment metadata in the personalized-segments database.

In some embodiments, the method further involves generating personalized-episode metadata (e.g., personalized segments, personalized media content item segments) containing segment metadata, the segment metadata including first-segment-type data and second-segment-type data, and wherein any one of (i) the first-segment-type data, (ii) the second-segment-type data, or (iii) both (i) and (ii) are personalized to the account associated with the request.

In some embodiments, the method further involves retrieving, from a segments database, prestored-segment metadata corresponding to at least one of a plurality of segments forming the episode, the prestored-segment metadata including first-segment-type data and second-segment-type data; and replacing at least a portion of the prestored-segment metadata with any one of (i) personalized first-segment-type data, (ii) personalized second-segment-type data, or (iii) both (i) and (ii).

In some embodiments, the method further involves retrieving, from a segments database, prestored-segment metadata corresponding to at least one of the plurality of segments forming the episode, the prestored-segment metadata including first-segment-type data and second-segment-type data, the first-segment-type data including: a first-segment identifier for retrieving the corresponding media content item, a start position corresponding to a beginning of the segment, a stop position corresponding to an end of the segment, and second-segment-type data.

The second-segment-type data includes: a second-segment identifier, a first source identifier corresponding to the second-segment identifier and indicating a first source of media content from which to retrieve a media content item, and an item number indicator indicating a number of tracks to retrieve from the first source of media content. In some embodiments the first-segment identifier and the second-segment identifier are different. The method further involves replacing the first-segment-type data with personalized first-segment-type data; and replacing the second-segment-type data with personalized second-segment-type data. In some embodiments, the method involves replacing any one of (i) the first-segment-type data with personalized first-segment-type data, (ii) the second-segment-type data with personalized second-segment-type data, or (iii) a combination thereof.

In some embodiments, the method further involves generating a notification indicating a media content item identified in the personalized-episode metadata has changed; and communicating the notification to the client device.

In another embodiment, a system for performing personalization involves a segments reader. The segments reader is configured to: receive a request for episode metadata corresponding to an episode; determine the episode metadata should be personalized to an account associated with the request; retrieve personalized-episode metadata associated with the account and the request; and provide the personalized-episode metadata to a client device associated with the request. Whether the episode metadata should be personalized can be determined by a personalization service. The segments reader, in some embodiments, incorporates the personalization service. In other embodiments, the personalization service is independent of the segments reader.

In some embodiments, the segments reader further operable to: determine a personalized-segments database contains personalized-segment metadata corresponding to the request; and inject the personalized-segment metadata into the personalized-episode metadata.

In some embodiments, the segments reader further operable to: cause a personalization service to determine whether a personalized-segments database does not contain personalized-segment metadata; obtain, from a recommendation system, personalized-segment metadata; inject the personalized-segment metadata into the personalized-episode metadata; and store the personalized-segment metadata in the personalized-segments database.

The segments reader, in some embodiments, is further operable to: generate personalized-episode metadata containing segment metadata, the segment metadata including first-segment-type data and second-segment-type data, and any one of (i) the first-segment-type data, (ii) the second-segment-type data, or (iii) both (i) and (ii) are personalized to the account associated with the request.

In some embodiments, the segments reader further operable to: retrieve, from a segments database, prestored-segment metadata corresponding to at least one of a plurality of segments forming the episode, the prestored-segment metadata including first-segment-type data and second-segment-type data; and replacing at least a portion of the prestored-segment metadata with any one of (i) personalized first-segment-type data, (ii) personalized second-segment-type data, or (iii) both (i) and (ii).

In some embodiments, the segments reader further operable to: retrieve, from a segments database, prestored-segment metadata corresponding to at least one of the plurality of segments forming the episode, the prestored-segment metadata including first-segment-type data and second-segment-type data, the first-segment-type data including: a first-segment identifier for retrieving the corresponding media content item, a start position corresponding to a beginning of the segment, and a stop position corresponding to an end of the segment, the second-segment-type data including: a second-segment identifier, a first source identifier corresponding to the second-segment identifier and indicating a first source of media content from which to retrieve a media content item, and an item number indicator indicating a number of media content items to retrieve from the first source of media content; and replace any one of (i) the first-segment-type data with personalized first-segment-type data, (ii) the second-segment-type data with personalized second-segment-type data, or (iii) a combination thereof.

In some embodiments, the segments reader is further operable to: generate a notification indicating a media content item identified in the personalized-episode metadata has changed; and communicate the notification to the client device.

In some embodiments, there is provided a non-transitory computer-readable medium having stored thereon one or more sequences of instructions for causing one or more processors to perform: receiving, e.g., by a segments reader, a request for episode metadata corresponding to an episode; determining, e.g., by a personalization service, the episode metadata should be personalized to an account associated with the request; retrieving personalized-episode metadata associated with the account and the request; and providing the personalized-episode metadata to a client device associated with the request.

In some embodiments, the non-transitory computer-readable medium further has stored thereon a sequence of instructions for causing the one or more processors to perform: determining a personalized-segments database contains personalized-segment metadata corresponding to the request; and injecting the personalized-segment metadata into the personalized-episode metadata.

In some embodiments, the non-transitory computer-readable medium further has stored thereon a sequence of instructions for causing the one or more processors to perform: determining a personalized-segments database does not contain personalized-segment metadata; obtaining, from a recommendation system, personalized-segment metadata; injecting the personalized-segment metadata into the personalized-episode metadata; and storing the personalized-segment metadata in the personalized-segments database.

In some embodiments, the non-transitory computer-readable medium further has stored thereon a sequence of instructions for causing the one or more processors to perform: generating personalized-episode metadata containing segment metadata, the segment metadata including first-segment-type data and second-segment-type data, and wherein any one of (i) the first-segment-type data, (ii) the second-segment-type data, or (iii) both (i) and (ii) are personalized to the account associated with the request.

In some embodiments, the non-transitory computer-readable medium further has stored thereon a sequence of instructions for causing the one or more processors to perform: retrieving, from a segments database, prestored-segment metadata corresponding to at least one of a plurality of segments forming the episode, the prestored-segment metadata including first-segment-type data and second-segment-type data; and replacing at least a portion of the prestored-segment metadata with any one of (i) personalized first-segment-type data, (ii) personalized second-segment-type data, or (iii) both (i) and (ii).

In some embodiments, the non-transitory computer-readable medium further has stored thereon a sequence of instructions for causing the one or more processors to perform: retrieving, from a segments database, prestored-segment metadata corresponding to at least one of the plurality of segments forming the episode, the prestored-segment metadata including first-segment-type data and second-segment-type data, the first-segment-type data including: a first-segment identifier for retrieving the corresponding media content item, a start position corresponding to a beginning of the segment, and a stop position corresponding to an end of the segment, the second-segment-type data including: a second-segment identifier, a first source identifier corresponding to the second-segment identifier and indicating a first source of media content from which to retrieve a media content item, and an item number indicator indicating a number of media content items to retrieve from the first source of media content; and replacing any one of (i) the first-segment-type data with personalized first-segment-type data, (ii) the second-segment-type data with personalized second-segment-type data, or (iii) a combination thereof.

In some embodiments, the non-transitory computer-readable medium further has stored thereon a sequence of instructions for causing the one or more processors to perform: generating a notification indicating a media content item identified in the personalized-episode metadata has changed; and communicating the notification to the client device.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

An episode, as used herein, refers to one part of a show that is communicated (e.g., broadcast, streamed, downloaded, etc.) in the form of one or more media files. A podcast episode, for example, is one or more recordings from the entire podcast.

A segment or episode segment, as used herein, refers to each of the parts into which an episode is or may be divided.

In an example implementation, the media content is represented by an identifier (also referred to as a media content item identifier) such as a uniform resource indicator (URI), which operates as a link to media content regarding an artist, an album, a media content item, and the like. Thus, an episode segment can be represented by one or more such identifiers.

Episode metadata, as used herein, refers to data regarding an episode. Example episode metadata includes any one or a combination of a segment identifier for retrieving the corresponding media content item, a start position corresponding to a beginning of the segment, a stop position corresponding to an end of the segment, a source identifier indicating a source of media content from which to retrieve a media content item, and an item number indicator indicating a number of media content items to retrieve from the source of media content.

In some embodiments, episode metadata includes a segment position defining a position in the episode that a corresponding media content item is to be played relative to other segments within an episode. Thus a content creator may initially arrange segment positions that can be changed (e.g., by shuffling the segments, receiving instructions via a user interface to rearrange the segments to a preferred order, and/or receiving a selection of one segment from a set of other segments to play at a particular time).

Figure 1:
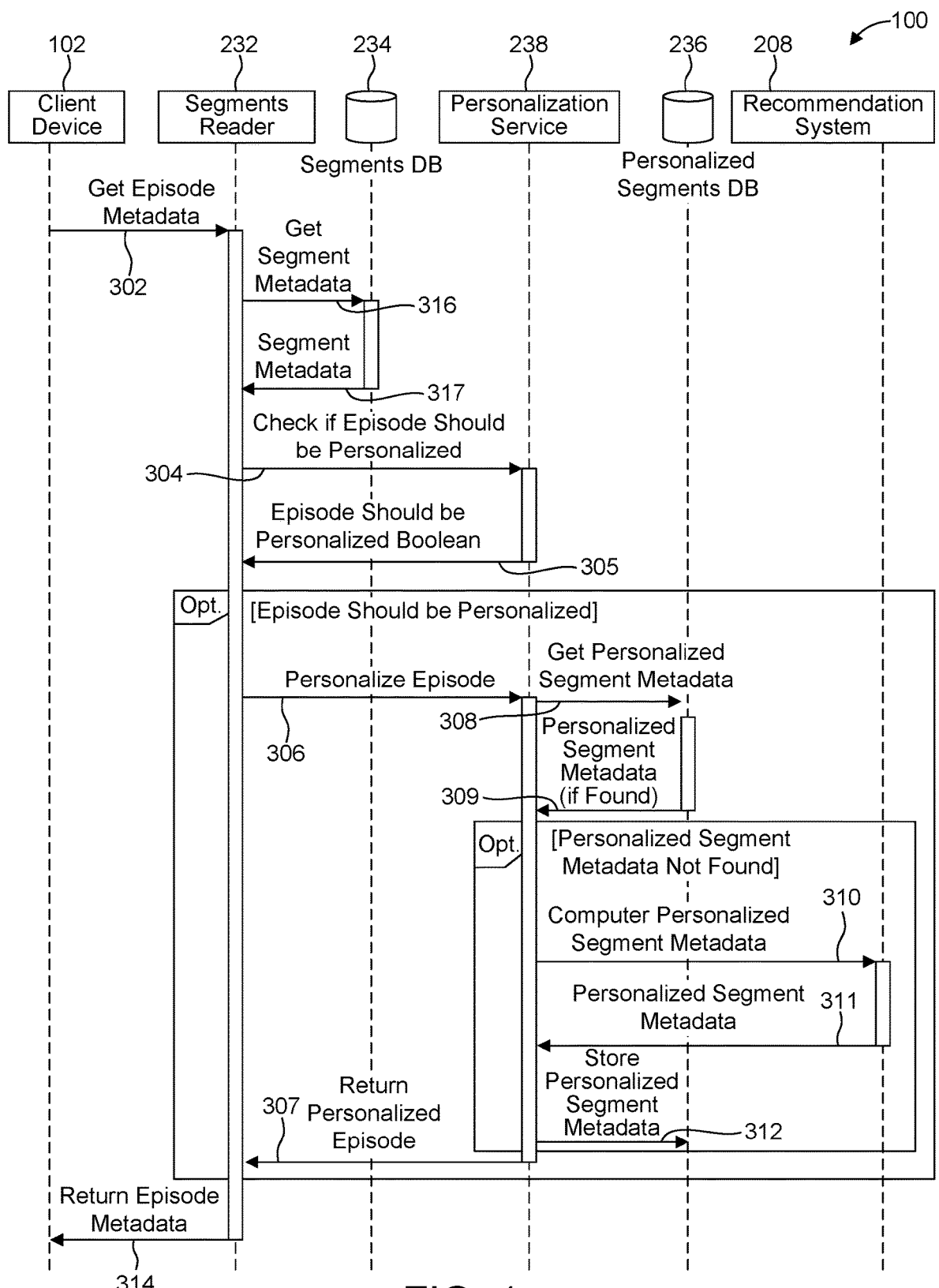
FIG. 1 is a system-flow diagram depicting a personalized media segmentation architecture according to an example embodiment.

FIG. 1 is a system-flow diagram of a personalized media segmentation architecture 100 according to an example embodiment. The personalized media segmentation architecture 100 includes a client device 102, a segments reader 232, a segments database 234, a personalization service 238, a personalized-segments database 236, and a recommendation system 208.

Client device 102 operates to request the segments reader 232 to retrieve episode metadata. In an example implementation, the request includes an account identifier. In an example implementation, the account identifier associates a user with an account with a media streaming service provider. In an example implementation, information corresponding to the account of the user is stored by the media streaming service provider.

In an example implementation, the request includes an episode identifier.

Segments reader 232 operates to receive from the client device 102 the request for episode metadata and to determine whether the episode metadata should be personalized. More specifically, segments reader 232 operates to determine whether the episode metadata should be personalized to an account associated with the request for episode metadata.

In some embodiments, the segments reader 232 operates in conjunction with a personalization service 238, which operates to determine whether the episode metadata should be personalized to an account associated with the request for episode metadata. For example, segment reader 232 can make a call to personalization service 238 to cause personalization service 238 to determine whether the episode metadata should be personalized to an account associated with the request for episode metadata. In some embodiments, personalization service 238 is incorporated in segments reader 232.

In some embodiments, segments reader 232 involves two segments readers, a first-segments reader that operates to obtain podcast metadata needed for playback of podcast-type media content and a second-segments reader that operates to obtain metadata needed by a graphical user interface (GUI) for display purposes. For simplicity, both the first-segments reader and the second-segments reader are referred to individually and collectively simply as segments reader 232.

In some embodiments, personalization service 238 operates to store data indicating whether an account associated with a request is flagged to be personalized. In some embodiments, personalization service 238 operates to store data indicating a particular episode should be personalized. In some embodiments, personalization service 238 operates to store data indicating a particular segment of an episode should be personalized.

In some embodiments, the segments reader 232 makes the determination the episode metadata should be personalized and provides the personalized-episode metadata to a client (e.g., the client that made the request).

In some embodiments, the segments reader 232 makes the determination the episode metadata should be personalized by querying the personalization service 238. In an example implementation, the segments reader 232 operates to query the personalization service 238 using an episode identifier. In another example implementation, the segments reader 232 operate to query the personalization service 238 using an account identifier corresponding to the account associated with the request from the client device 102. In an example embodiment, the indication as to whether the episode should be personalized is a Boolean flag indicator. In another non-limiting example, the indication as to whether the episode should be personalized can also be a predefined range (e.g., plural increments) that provides tuning of the personalization levels. In an example implementation, the tuning is in the form of selectable steps, thereby enabling stepwise tuning of the personalization levels.

Personalization service 238, in some embodiments, is a service that is called by segments reader 232 (e.g., referred to as a personalization service service). In other embodiments, personalization service 238 is incorporated into segments reader 232. Accordingly, while example aspects are described in terms of the segments reader 232 performing most of the functions, it is also within the scope to use components external to the segments reader 232 to perform certain operation described herein.

In an example implementation, if the segments reader 232 determines the episode metadata should be personalized to an account associated with the request, segments reader 232 further operates to retrieve personalized-episode metadata associated with the account and the request and provide the personalized-episode metadata to a client device 102 associated with the request.

In some embodiments, the segments reader 232 operates to determine whether a personalized-segments database 236 contains personalized-segment metadata corresponding to the request. If segments reader 232 determines personalized-segments database 236 contains personalized-segment metadata corresponding to the request, then segments reader 232 further operates to inject the personalized-segment metadata into the personalized-episode metadata.

In some embodiments, segments reader 232 determines personalized-segments database 236 does not contain personalized-segment metadata. If segments reader 232 determines personalized-segments database 236 does not contain personalized-segment metadata, then segments reader 232 further operates to obtain from recommendation system 208 personalized-segment metadata and to inject the personalized-segment metadata into the personalized-episode metadata and store the personalized-segment metadata in the personalized-segments database 236.

In some embodiments, segments reader 232 operates to generate personalized-episode metadata containing segment metadata. The segment metadata can include first-segment-type data and second-segment-type data, where any one of (i) the first-segment-type data, (ii) the second-segment-type data, or (iii) both (i) and (ii) are personalized to the account associated with the request.

In some embodiments, segments reader 232 operates to retrieve from a segments database 234, prestored-segment metadata corresponding to at least one of a plurality of segments forming the episode (e.g., where the episode corresponds to the request from the client device 102). In an example implementation, the prestored-segment metadata includes first-segment-type data and second-segment-type data.

Segments reader 232 further operates to replace at least a portion of the prestored-segment metadata with any one of (i) personalized first-segment-type data, (ii) personalized second-segment-type data, or (iii) both (i) and (ii).

In some embodiments, segments reader 232 further operates to retrieve, from a segments database 234, prestored-segment metadata corresponding to at least one of the plurality of segments forming the episode. In an example implementation, the prestored-segment metadata includes first-segment-type data and second-segment-type data. The first-segment-type data, in some embodiments, includes: a first-segment identifier for retrieving the corresponding media content item, a start position corresponding to a beginning of the segment, and a stop position corresponding to an end of the segment, and second-segment-type data. The second-segment-type data, in some embodiments, includes: a second-segment identifier, a first source identifier corresponding to the second-segment identifier and indicating a first source of media content from which to retrieve a media content item, and an item number indicator indicating a number of media content items to retrieve from the first source of media content.

In some embodiments, the second-segment-type data can also include a segment position defining a position in the episode that a corresponding media content item is to be played relative to other segments in the episode.

The first-segment-type data can be replaced with personalized first-segment-type data and the second-segment-type data can be replaced with personalized second-segment-type data.

In some embodiments, segments reader 232 further operates to generate a notification indicating a media content item identified in the personalized-episode metadata has changed and to communicate the notification to the client device 102. This enables the user of the client device 102 to be notified by the client device 102 of a change in the content of a previously personalized episode.

Still referring to FIG. 1, a method for performing personalization involves a request operation 302 that performs receiving, by the segments reader 232, a request for episode metadata corresponding to an episode. A personalization determination operation 304, in turn, performs determining whether the episode metadata should be personalized to an account associated with the request. If personalization determination operation 304 determines the episode metadata should be personalized, in some embodiments, a response operation 305 provides a value indicating whether the episode should be personalized. In an example implementation, a value representing a flag (e.g., a Boolean) is returned by the response operation 305 to the segments reader 232 to indicate the episode should be personalized.

If personalization determination operation 304 determines the episode metadata should be personalized, a personalized-episode metadata retrieving operation 306 performs retrieving personalized-episode metadata associated with the account and the request. In turn, a personalized-episode metadata return operation 307 performs returning the personalized-episode metadata. A personalized-episode metadata provisioning operation 314 then performs providing the personalized-episode metadata to a client device 102 associated with the request. This enables the client device 102 to playback media content items identified by the personalized-episode metadata.

In an example implementation, the personalized-segment metadata is prestored in the personalized-segments database 236.

In some embodiments, personalized-episode metadata retrieving operation 306 further involves determining whether personalized-segments database 236 contains personalized-segment metadata corresponding to the request. If personalized-episode metadata retrieving operation 306 determines the personalized-segments database 236 contains personalized-segment metadata corresponding to the request, a personalized-segment metadata retrieving operation 308 performs retrieving personalized-segment metadata from the personalized-segments database 236 and a personalized-segment metadata injection operation 309 performs injecting the personalized-segment metadata into the personalized-episode metadata. Personalized-episode metadata return operation 307, in turn, performs returning the personalized-episode metadata (e.g., to segments reader 232) and personalized-episode metadata provisioning operation 314 performs providing the personalized-episode metadata to a client device 102 associated with the request.

If personalized-episode metadata retrieving operation 306 determines the personalized-segments database 236 does not contain personalized-segment metadata corresponding to the request, a recommendation system request operation 310 performs obtaining, from a recommendation system 208, personalized-segment metadata. In an example embodiment, recommendation system request operation 310 involves requesting the recommendation system 208 to compute the personalized-segment metadata. In turn, a personalized-segment metadata injection operation 311 performs injecting the personalized-segment metadata (e.g., obtained from the recommendation system 208) into the personalized-episode metadata.

A personalized-segment metadata storing operation 312 performs storing the personalized-segment metadata (e.g., obtained from the recommendation system 208) in the personalized-segments database 236.

Personalized-episode metadata return operation 307, in turn, performs returning the personalized-episode metadata and personalized-episode metadata provisioning operation 314 performs providing the personalized-episode metadata to a client device 102 associated with the request.

In some embodiments, personalized-episode metadata return operation 307 further involves a personalized-episode metadata generating operation that performs generating personalized-episode metadata containing segment metadata, where the segment metadata includes first-segment-type data and second-segment-type data, where any one of (i) the first-segment-type data, (ii) the second-segment-type data, or (iii) both (i) and (ii) are personalized to the account associated with the request. In an example implementation, personalized-episode metadata generating operation can be performed by segments reader 232 causing recommendation system 208 to perform the generating personalized-episode metadata operation.

In some embodiments, a prestored-segment metadata retrieving operation 316 performs retrieving, from a segments database 234, prestored-segment metadata corresponding to at least one of a plurality of segments forming the episode, the prestored-segment metadata including first-segment-type data and second-segment-type data. A prestored-segment metadata replacement operation 317, in turn, performs replacing at least a portion of the prestored-segment metadata with any one of (i) personalized first-segment-type data, (ii) personalized second-segment-type data, or (iii) both (i) and (ii). This can be the case, for example, when a user of client device 102 issues through a user input device of the client device a request to replace prestored-segment metadata with personalized-segment metadata.

In some embodiments, prestored-segment metadata retrieving operation 316 performs retrieving, from a segments database 234, prestored-segment metadata corresponding to at least one of the plurality of segments forming the episode, the prestored-segment metadata including first-segment-type data and second-segment-type data. In this example embodiment, the first-segment-type data includes: a first-segment identifier for retrieving the corresponding media content item, a start position corresponding to a beginning of the segment, and a stop position corresponding to an end of the segment, and second-segment-type data. The second-segment-type data includes: a second-segment identifier, a first source identifier corresponding to the second-segment identifier and indicating a first source of media content from which to retrieve a media content item, and an item number indicator indicating a number of media content items to retrieve from the first source of media content. A first-segment-type data replacement operation, in turn, performs replacing the first-segment-type data with personalized first-segment-type data. A second-segment-type data replacement operation performs replacing the second-segment-type data with personalized second-segment-type data.

In some embodiments, a notification generation operation (not shown) performs generating a notification indicating a media content item identified in the personalized-episode metadata has changed and communicating the notification to the client device 102.

In some embodiments, client device 102 further operates to provide a selectable icon, which when selected causes the segments reader 232 to cause personalized metadata to be returned as described above. In some examples, the client device 102 further operates to receive input from a user indicating one or more particular segments of an episode to be personalized.

In some embodiments, segments of an episode are pre-tagged (e.g., by a creator of the episode or a creator of a segment of an episode) to indicate which segments are required to be personalized as described above. Such pre-tagged segments will cause the segments reader 232 to automatically personalize at least a portion of the episode metadata.

Figure 2:
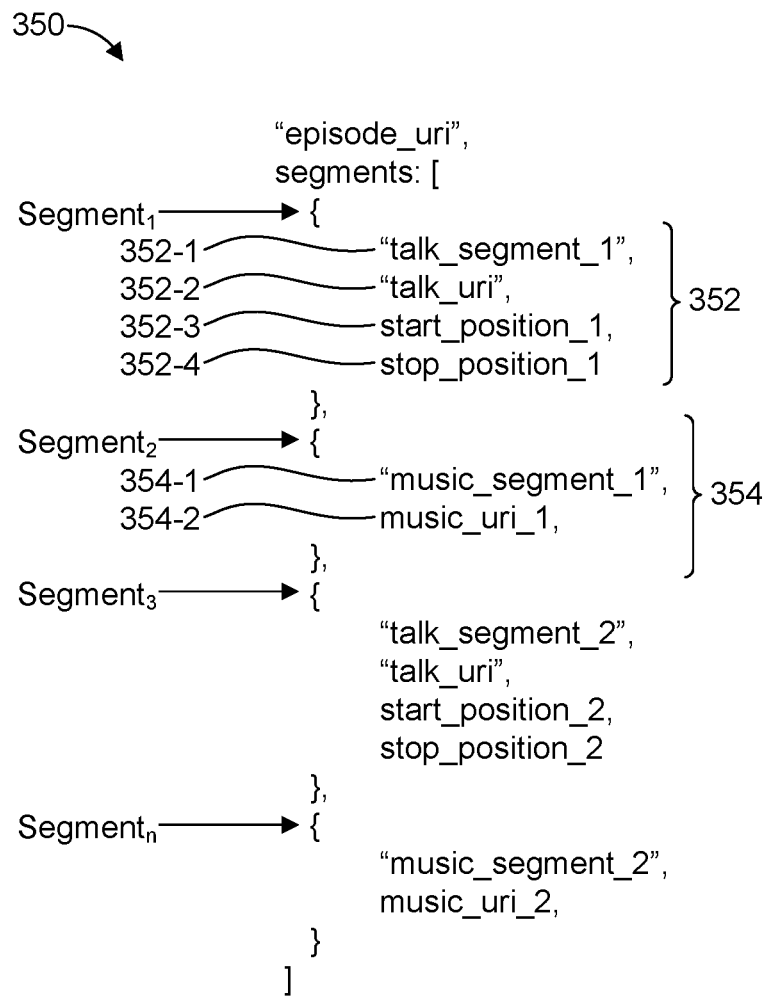
FIG. 2 illustrates a prior art example of a structure of prestored-segment metadata that is provided to a client device.

FIG. 2 illustrates a prior art example of a structure of prestored-episode metadata 350 that is provided to a client device 102. The prestored-episode metadata 350 is an example of information a client device 102 requires to playback segments of an episode containing both talk and music. As shown in this example, the prestored-episode metadata 350 is not arranged to cause a playback delivery system to personalize an episode. In this example, the prestored-segment metadata corresponds to at least one of the plurality of segments forming the episode and includes first-segment-type data 352 and second-segment-type data 354.

Accordingly, prestored-episode metadata 350 can operate as a request for episode metadata corresponding to an episode that cannot be personalized.

In some embodiments prestored-episode metadata 350 includes one or more segment (segment$_1$, segment$_2$, segment$_3$, ..., segment$_n$). As shown in FIG. 2, first-segment-type data 352 corresponds to a first segment (segment$_1$) defining a segment in the episode for which a corresponding media content item is to be played. The first-segment-type data 352 can include: a first-segment name 352-1, a first-segment identifier 352-2 for retrieving the corresponding media content item, a start position 352-3 corresponding to a beginning of the first-segment, and a stop position 352-4 corresponding to an end of the first-segment. In this example use case the segment type data 352 corresponds to a talk segment of an episode. The second-segment-type data 354 corresponds to a second-segment (segment$_2$) defining a segment in the episode that a corresponding media content item is to be played. The second-segment data 354 can include: a second-segment name 354-1, and a second-segment identifier 354-2 for retrieving a corresponding media content item. Additional segments can follow as shown in FIG. 2 (e.g., segment$_3$, ..., segment$_n$).

Figure 3:
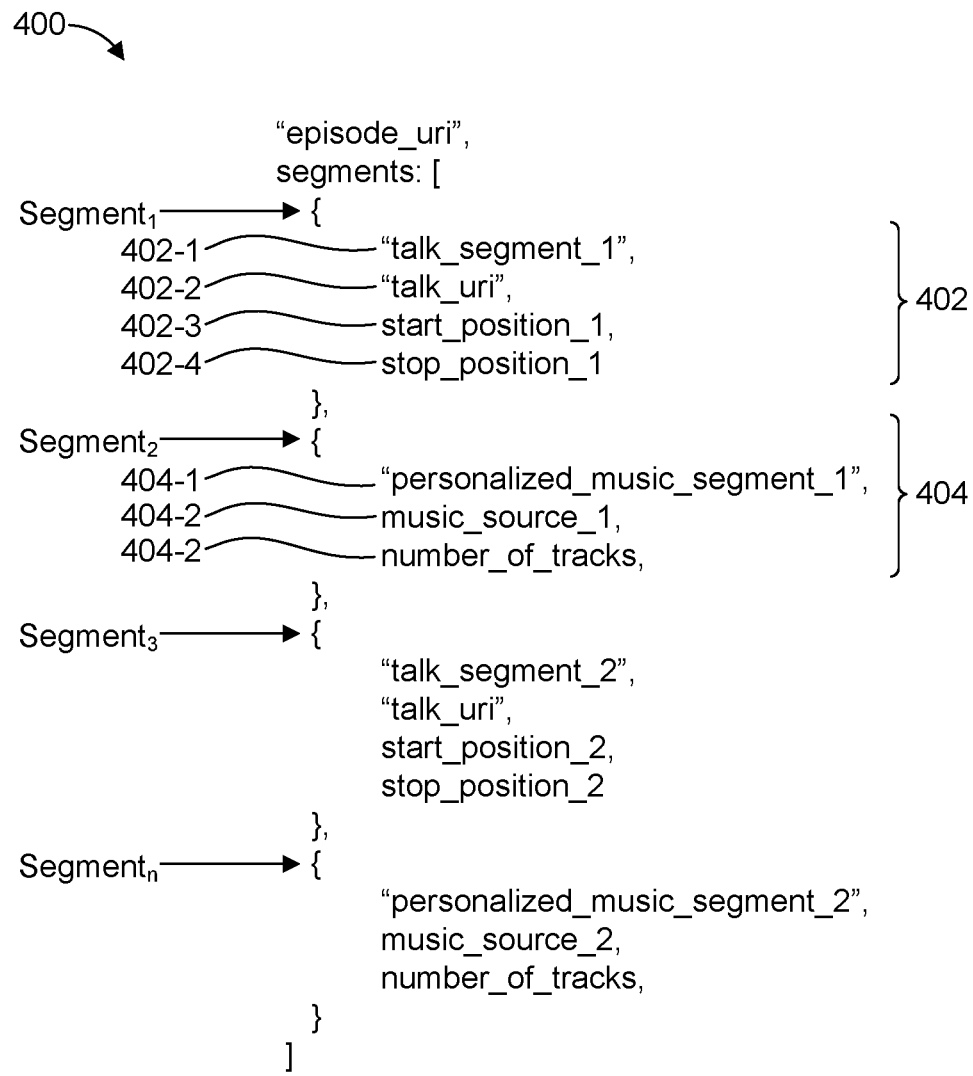
FIG. 3 illustrates an example of a structure of prestored segment metadata 400 according to some embodiments.

FIG. 3 illustrates an example of a structure of prestored-segment metadata 400 according to some embodiments. However, unlike the prestored-segment metadata described above in connection with FIG. 2, prestored-segment metadata 400 indicates what metadata is enabled to be personalized for a particular account. Prestored-segment metadata 400 corresponds to at least one of a plurality of segments that form an episode. In some embodiments prestored-episode metadata 400 includes one or more segments (segment$_1$, segment$_2$, segment$_3$, ..., segment$_n$). In this example, prestored-segment metadata 400 includes first-segment-type data 402 and second-segment-type data 404. The first-segment-type data 402 corresponds to a first-segment (segment$_1$) defining the segment that a corresponding media content item is to be played within the episode. The first-segment-type data 402 can include: a first-segment name 402-1, a first-segment identifier 402-2 for retrieving the corresponding media content item, a start position 402-3 corresponding to a beginning of the first-segment (segment$_1$), and a stop position 402-4 corresponding to an end of the first-segment (segment$_1$).

The second-segment-type data 404 can include a second-segment (segment$_2$) defining a second segment in the episode that a corresponding media content item is to be played. The second-segment-type data 404 can include a second-segment identifier 404-1. Notably, the second-segment identifier 404-1 provides instructions to the segments reader 232 of FIG. 1 to personalize the second-segment according to the operations described herein. The second-segment-type data 404 includes a first source identifier 404-2 corresponding to the second-segment identifier 404-1. First source identifier 404-2 indicates to segments reader 232 a first source of media content from which to retrieve a media content item. The second-segment-type data 404 further includes an item number indicator 404-2 indicating to the segments reader 232 a number of media content items to retrieve from the first source of media content. The number of media content items to retrieve indicated by the item number indicator 404-2 thus determines how many media content items to inject in a segment (e.g., in this example implementation, second-segment-type data 404.

In some embodiments, the first-segment identifier 404-1 can also provide instructions to the segments reader 232 of FIG. 1 to personalize the first segment. Thus, either the first-segment-type data 402 can be arranged to be replaced with personalized first-segment-type data and/or the second-segment-type data can be arranged to be replaced with personalized second-segment-type data. While the example depicted in FIG. 3 involves personalizing a music segment, the talk segment can be replaced as well. Further other segments can be personalized as shown in FIG. 3 (e.g., segment$_3$, ..., segment$_n$).

The result of the replacement is a personalized episode metadata that is provided to a client device 102 to enable playback of an episode including segments that have been personalized for a particular account (e.g., user).

Example System Implementation

Figure 4:
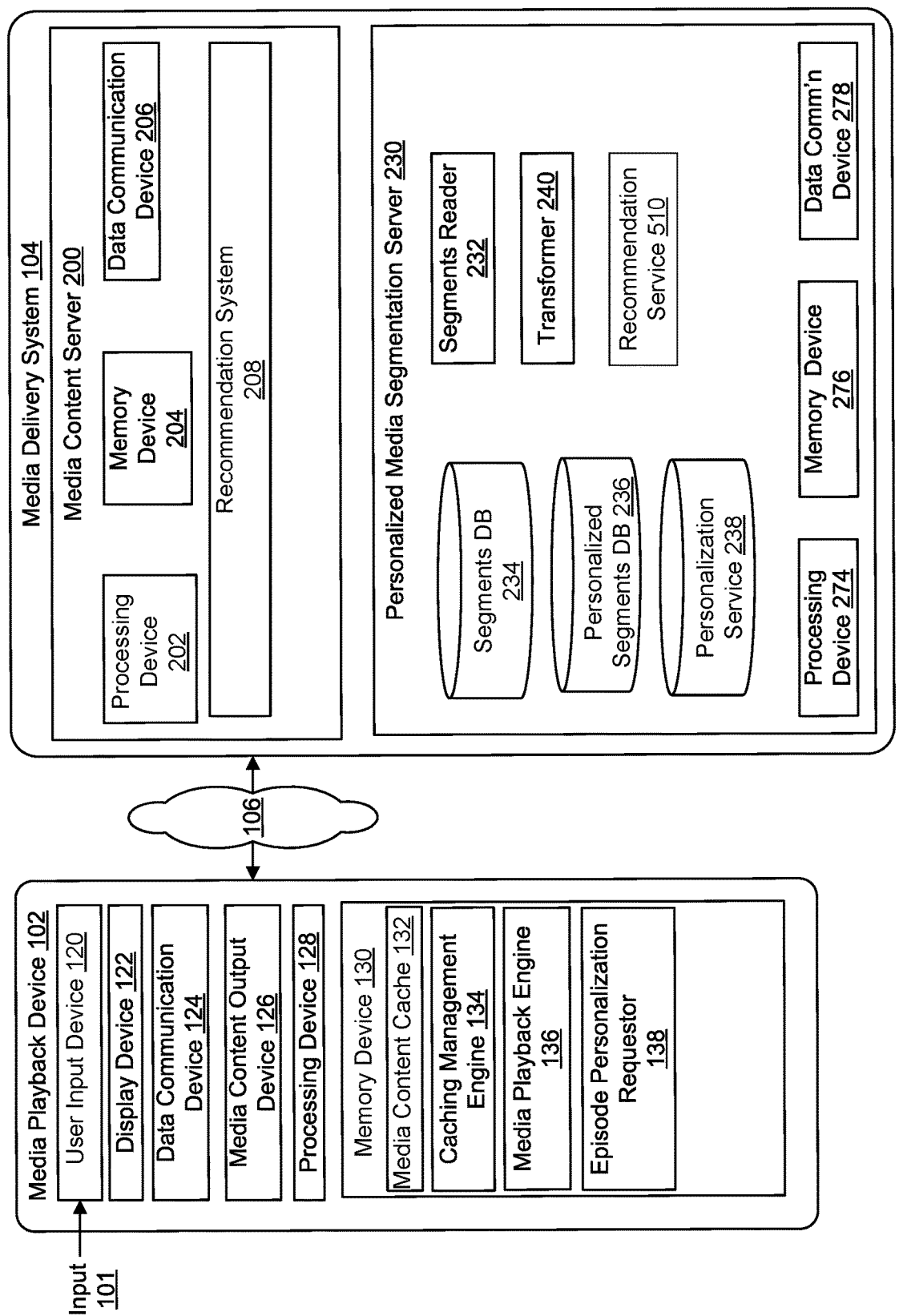
FIG. 4 is a representative view of a system in which some embodiments of the invention may be implemented.

FIG. 4 is a representative view of a system in which some embodiments of the invention may be implemented. The system includes a media playback device 102 (also referred to herein as a client device 102) and a media delivery system 104. The media delivery system 104 operates to provide media content to one or more media playback devices 102, such as the media playback device 102, via the network 106.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types.

The media playback device 102 includes a user input device 120, a display device 122, a data communication device 124, a media content output device 126, a processing device 128, and a memory device 130.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smart speaker, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio, etc.

A user input device 120 of media playback device 102 operates to receive a user input from a user for controlling the media playback device 102. The user input can include a manual input and/or a voice input. In some embodiments, the user input device 120 includes one or more buttons, keys, touch levers, switches, and/or other mechanical input devices for receiving the input 101.

In some embodiments, the user input device 120 can detect sounds including the voice input such as a voice of a user (e.g., an utterance) for controlling playback of media content via the media playback device 102.

Display device 122 operates to display a graphical user interface that displays information for interacting with the media playback device 102. Examples of such information include media content playback information, notifications, and other information. In some embodiments, the display device 122 is configured as a touch sensitive display and includes the user input device 120 for receiving the input 101 from a selector (e.g., a finger, stylus etc.) controlled by a user. In some embodiments, therefore, the display device 122 operates as both a display device and a user input device.

The data communication device 124 operates to enable the media playback device 102 to communicate with one or more computing devices over one or more networks, such as the network 106. For example, the data communication device 124 is configured to communicate with the media delivery system 104 and receive media content from the media delivery system 104 at least partially via the network 106. The data communication device 124 can be a network interface of various types which connects the media playback device 102 to the network 106.

The media content output device 126 operates to output media content (e.g., via one or more speakers which are incorporated in the media playback device 102 or via external speaker such as headphones, a portal speaker, a vehicle entertainment system, etc.), The processing device 128, in some embodiments, comprises one or more central processing units (CPU). In other embodiments, the processing device 128 additionally or alternatively includes one or more digital signal processors, graphical processing units (GPUs), field-programmable gate arrays, or other electronic circuits.

The memory device 130 typically includes at least some form of non-transitory computer-readable media. Non-transitory computer readable-media includes any available media that can be accessed by the media playback device 102, such as volatile and nonvolatile, removable and non-removable media implemented in any device configured to store information such as computer readable instructions, data structures, program modules, or other data. Memory device 130 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102 in a non-transitory manner.

The memory device 130 operates to store data and instructions. In some embodiments, the memory device 130 stores instructions for a media content cache 132, a caching management engine 134, a media playback engine 136.

Some embodiments of the memory device 130 include the media content cache 132. The media content cache 132 stores media content items, such as media content items that have been received from the media delivery system 104. In some embodiments, the media content cache 132 also stores metadata about media content items such as title, artist name, album name, length, genre, mood, era, etc. The media content cache 132 can further store playback information about the media content items and/or other information associated with the media content items.

The caching management engine 134 is configured to receive and cache media content in the media content cache 132 and manage the media content stored in the media content cache 132. In some embodiments, when media content is streamed from the media delivery system 104, the caching management engine 134 operates to cache at least a portion of the media content into the media content cache 132. In other embodiments, the caching management engine 134 operates to cache at least a portion of media content into the media content cache 132 while online so that the cached media content is retrieved for playback while the media playback device 102 is offline.

The media playback engine 136 operates to play media content to a user. As described herein, the media playback engine 136 is configured to communicate with the media delivery system 104 to receive one or more media content items (e.g., through a media stream). In other embodiments, the media playback engine 136 is configured to play media content that is locally stored in the media playback device 102.

In some embodiments, the media playback engine 136 operates to retrieve one or more media content items that are either locally stored in the media playback device 102 or remotely stored in the media delivery system 104. In some embodiments, the media playback engine 136 is configured to send a request to the media delivery system 104 for media content items and receive information about such media content items for playback.

In some embodiments, an episode personalization requestor 138 operates to request the media delivery system 104 to personalize an episode by returning personalized episode metadata.

Media delivery system 104 includes a media content server 200, a recommendation system 208, and a personalized media segmentation server 230.

Media delivery system 104 interacts with the media playback device 102 to provide the media playback device 102 with various functionalities.

In at least some embodiments, the media content server 200 and the personalized media segmentation server 230 (or components thereof) are provided by separate computing devices. In other embodiments, the media content server 200 and the personalized media segmentation server 230 are provided by the same computing device(s).

The media content server 200 transmits stream media to media playback devices such as the media playback device 102. In some embodiments, the media content server 200 includes a processing device 202, a memory device 204, and a data communication device 206. The processing device 202 and the memory device 204 may be similar to the processing device 128 and the memory device 130, respectively, which have each been previously described. Therefore, the description of the processing device 202 and the memory device 204 are omitted for brevity purposes.

The data communication device 206 operates to communicate with other computing devices over one or more networks, such as the network 106. Examples of the data communication device include one or more wired network interfaces and wireless network interfaces.

In some embodiments, media content server 200 executes a media server application configured to stream media content, such as music or other audio, video, or other suitable forms of media content. The media server application can include a media stream service that operates to buffer media content, such as media content items, for streaming to one or more media streams.

The media content server 200 can receive requests or other communication from media playback devices or other systems, such as the media playback device 102, to retrieve media content items from the media content server 200.

In some embodiments, media content server 200 stores media content items, media content metadata, media contexts, user accounts, and taste profiles.

Media content items may be audio, video, podcasts or any other type of media content, which may be stored in any format for storing media content.

Media content metadata, as used herein, provides various information (also referred to herein as attribute(s)) associated with the media content items. In addition, or alternatively, the media content metadata provides various information associated with the media contexts. In some embodiments, the media content metadata includes one or more of title, artist name, album name, length, genre, mood, era, etc.

Media contexts can include playlists. The playlists are used to identify one or more of the media content items. In some embodiments, the playlists identify a group of the media content items in a particular order. In other embodiments, the playlists merely identify a group of the media content items without specifying a particular order. Some, but not necessarily all, of the media content items included in a particular one of the playlists are associated with a common characteristic such as a common genre, mood, or era.

In some embodiments, a user can listen to media content items in a playlist by selecting the playlist via a media playback device, such as the media playback device 102. The media playback device then operates to communicate with the media delivery system 104 so that the media delivery system 104 retrieves the media content items identified by the playlist and transmits data for the media content items to the media playback device for playback.

In some embodiments, the playlist includes one or more playlist descriptions. The playlist descriptions include information associated with the playlist. The playlist descriptions can include a playlist title. In some embodiments, the playlist title can be provided by a user using the media playback device 102. In other embodiments, the playlist title can be provided by a media content provider (or a media-streaming service provider). In yet other embodiments, the playlist title can be automatically generated.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist includes a list of media content item identifications (IDs). The list of media content item identifications includes one or more media content item identifications that refer to respective media content items. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata, which can further include other attributes of the media content item, such as album name, length, genre, mood, era, etc. as described herein.

At least some of the playlists may include user-created playlists. For example, a user of a media streaming service provided using the media delivery system 104 can create a playlist and edit the playlist by adding, removing, and rearranging media content items in the playlist. A playlist can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles as described herein. Other information or factors can be used to determine the recommended media content items.

In addition, or alternatively, at least some of the playlists are created by a media streaming service provider. For example, such provider-created playlists can be automatically created by the media delivery system 104. In some embodiments, a provider-created playlist can be customized to a particular user or a particular group of users. By way of example, a playlist for a particular user can be automatically created by the media delivery system 104 based on the user's listening history (e.g., the user's taste profile) and/or listening history of other users with similar tastes. In other embodiments, a provider-created playlist can be configured to be available for the public in general. Provider-created playlists can also be sharable with other users.

Referring still to FIG. 4, in some embodiments, personalized media segmentation server 230 includes segments reader 232, segments database 234, personalization service 238, and personalized-segments database 236 which operate as described above in connection with FIG. 1. In addition, in some embodiments, personalized media segmentation server 230 includes a transformer 240 that operates to receive episode media content and transform episode media content into a structure for use by the media content server 200.

In some embodiments, personalized media segmentation server 230 includes a recommendation service 510 that operates to obtain personalized segment data to be inserted into the episode metadata, for example by making a call to recommendation system 208.

In some embodiments, the personalized media segmentation server 230 includes a processing device 274, a memory device 276, and a data communication device 278. The processing device 274, the memory device 276, and the data communication device 278 for personalized media segmentation server 230 may be similar to the processing device 202, the memory device 204, and the data communication device 206, respectively, which have each been previously described.

Figure 5:
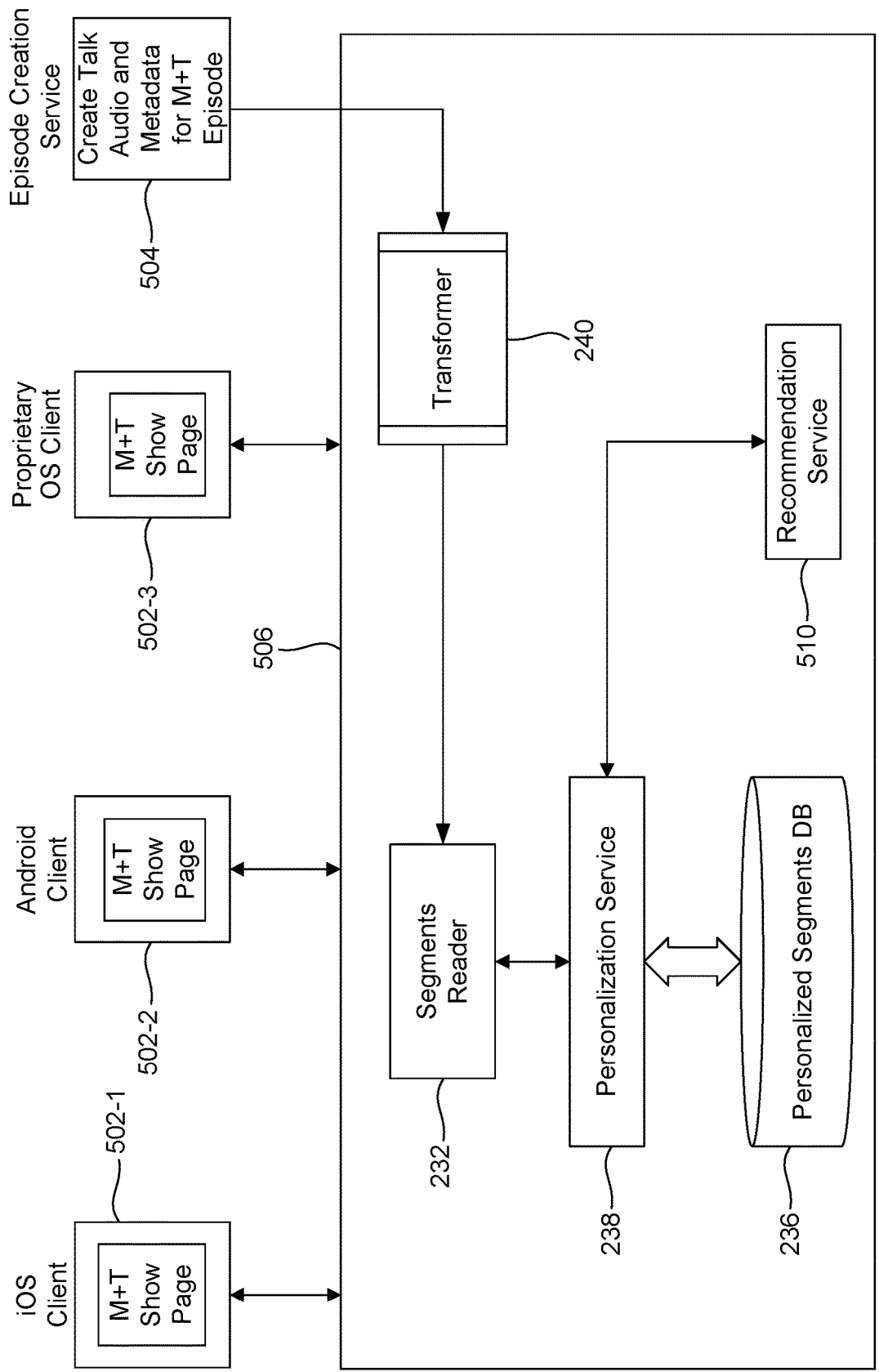
FIG. 5 is an example use case in which an episode consisting of music and talk segments is personalized according to an example embodiment.

FIG. 5 is an example use case in which an episode consisting of music and talk segments is personalized according to an example embodiment. In this example use case, an episode creation service 504 creates a talk-audio episode together with metadata regarding one or more episodes. The episode content including metadata is published for a media delivery system to deliver to clients such as a client device 502-1 (e.g., an iOS based client device), a client device 502-2 (an android based client device), and a client device 502-3 (executing a proprietary operating system client device).

A transformer 240 operates to receive the episode media content and metadata and transform the information into a structure for capable of being delivered (e.g., processed, streamed, made available for download) via a delivery content system such as media delivery system 104 of FIG. 4. As explained above, prior art segment metadata can include first-segment-type data and second-segment-type data, where the segment metadata is communicated to a client device to enable the client device to playback the episode. In an example aspect, the episode metadata is, prior to communicating it to a client device, communicated to segments reader 232. In some embodiments, the segments reader 232, in turn, communicates the episode metadata to a personalization service 238 along with a query for personalized segments.

In one embodiment, the segments reader 232 causes the personalization service 238 to determine if the metadata has already been personalized. In one embodiment, the segments reader 232 causes the personalization service 238 to determine if the metadata is required to be personalized.

The personalization service 238, in turn, operates to provide an indication to the segments reader 232 whether any segment metadata is required to be personalized with personalized segment metadata. In an example implementation, the segment metadata is personalized episode metadata for a given user-id and episode-id.

In an example embodiment, a recommendation service 510 operates to obtain personalized segment data to be inserted into the episode metadata. This may be accomplished by making a call to a recommendation system such as recommendation system 208 described above in connection with FIG. 1. In some embodiments, the episode creation service 504 can indicate which segments should be personalized. In some embodiments, an operator of a client device (e.g., 502-1, 502-2, 502-3; collectively and individually client device 502) provides an instruction via the client device 502 requesting the segments reader 232 to personalize one or more segments in the episode metadata. If personalized data does not already exist, e.g., in personalized-segments database 236, segments reader 232 can make a call to a recommendation service 510. Recommendation service 510, in turn, can operate to obtain (e.g., from a recommendation system) segment metadata within the episode metadata that can be personalized.

In one example implementation, the episode metadata is provided by segments reader 232 directly to recommendation service 510. In another example implementation, the episode metadata is provided by segments reader 232 indirectly to recommendation service 510 via personalization service 238. In yet another example implementation, the episode metadata is provided by segments reader 232 includes personalization service 510.

In some embodiments, if personalized data does not already exist, e.g., in personalized-segments database 236, personalization service 238 (instead of segments reader 232) can make a call to a recommendation service 510. Recommendation service 510, in turn, can operate to obtain (e.g., from a recommendation system) segment metadata within the episode metadata that can be personalized.

In one example implementation, the episode metadata is provided by segments reader 232 directly to recommendation service 510. In another example implementation, the episode metadata is provided by segments reader 232 indirectly to recommendation service 510 via personalization service 238. In yet another example implementation, the episode metadata is provided by segments reader 232 includes personalization service 510.

In turn, segments reader 232 injects personalized segment metadata obtained by the recommendation service 510 into the episode metadata. In some embodiments, segments reader 232 further operates to save the personalized episode segment data in personalized-segments database 236 for future retrieval. In some embodiments, personalization service 238 further operates to cause the personalized episode segment data to be saved in personalized-segments database 236 for future retrieval.

By saving the personalized episode segment data in personalized-segments database 236, a call to a recommendation service 510 to repeat the process is not necessary. Instead, when a client device makes a call for episode metadata, segments reader 232 makes a call to personalization service 238 to determine if the episode metadata has segments that have previously been personalized. Depending on the response, personalization of the episode metadata (particularly any segments metadata) does or does not occur.

In some embodiments, a call to the personalization service 238 to obtain updated segment metadata can be independently requested. For example, by an operator a client device or by an operator of the personalization service 238 (e.g., a user wishes an update or in the event the service provider is no longer licensed to play a particular track). In an example implementation, personalization service 238, upon receiving an update instruction for one or more segments, can disregard the applicable segment(s) has/have already been personalized. In an example use case, a user of a client device (e.g., client device 102 of FIG. 1 or client device 502 of FIG. 5) may decide they desire a recommendation system to provide updated segment metadata. The user can select via an interface of the client device one or more segments and select an instruction to cause an update (e.g., "update selected segments"). In turn, this instruction causes personalization service 238 to update any corresponding segments.

In yet another implementation, if a user of the client device wishes to listen to the same previously personalized episode metadata, the personalization service 238 can retrieve the personalized episode metadata from the personalized-segments database 236. Advantageously, this enables a user of a client device to maintain the same personalized episode metadata without concern that it will be updated.

Thus a user can decide to update the episode metadata (whether or not it has been previously personalized) and generate via the client device a request to the segments reader 232 to cause the personalization service 238 to obtain new segment metadata from the recommendation service 510. Or a user can affirmatively issue an instruction to maintain previously personalized episode metadata.

This enables more flexibility either through a client device 502 or by an episode creation service by enabling those entities to have more control over what metadata is personalized.

In some embodiments, the personalization service 108 described above performs the same operations as the personalization service 238 described in connection with FIG. 5. In some embodiments, the segments reader 232 described herein performs the same operations as the personalization service 238. In some embodiments, recommendation system 208 performs the same operations as recommendation service 510.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments but should be defined only in accordance with the following claims and their equivalents.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular examples only and is not intended to be limiting. As used herein, the singular forms "a", "an" and "the" are intended to include the plural forms as well, unless the context clearly indicates otherwise.

Illustrative examples of the disclosure are described below. In the interest of clarity, not all features of an actual implementation are described in this specification. It will of course be appreciated that in the development of any such actual example, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Software embodiments of the example embodiments presented herein may be provided as a computer program product, or software, that may include an article of manufacture on a machine accessible or machine-readable medium having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The performance of the one or more actions enables enhanced and automated selection and output of the data corresponding to media content. This means that data which is selected and output according to the processes described herein are of enhanced contextual relevance and in this regard can be automatically selected and output at significantly improved rates, for example the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for performing personalization, comprising the steps of:
  receiving, from a client device, a request for episode metadata corresponding to an episode;
  retrieving, from a segments database, prestored-segment metadata corresponding to at least one of a plurality of segments forming the episode, the prestored-segment metadata including an instruction to personalize at least one segment of the prestored-segment metadata;
  determining the episode metadata should be personalized to an account associated with the request based on the instruction;
  retrieving personalized-episode metadata associated with the account and the request;
  providing the personalized-episode metadata to the client device associated with the request;

receiving, from the client device, either:
  a request to update one or more segments of the episode, or
  a request to maintain previously personalized episode metadata corresponding to one or more segments of the episode;
in response to the request to update one or more segments of the episode:
  receiving, from a recommendation system, updated segment metadata, and
  replacing the one or more segments of the episode with the updated segment metadata; and
in response to the request maintain previously personalized episode metadata, maintaining the previously personalized episode metadata for the one or more segments of the episode.

2. The method according to claim 1, further comprising the steps of:
  determining a personalized-segments database contains personalized-segment metadata corresponding to the request; and
  injecting the personalized-segment metadata into the personalized-episode metadata by replacing at least a portion of the prestored-segment metadata with the personalized-segment metadata.

3. The method according to claim 1, further comprising the steps of:
  determining a personalized-segments database does not contain personalized-segment metadata;
  obtaining, from a recommendation system, personalized-segment metadata;
  injecting the personalized-segment metadata into the personalized-episode metadata by replacing at least a portion of the prestored-segment metadata with the personalized-segment metadata; and
  storing the personalized-segment metadata in the personalized-segments database.

4. The method according to claim 1, further comprising the step of:
  generating personalized-episode metadata containing segment metadata, the segment metadata including first-segment-type data and second-segment-type data, and wherein any one of (i) the first-segment-type data, (ii) the second-segment-type data, or (iii) both (i) and (ii) are personalized to the account associated with the request.

5. The method according to claim 1, further comprising the steps of:
  wherein the prestored-segment metadata corresponds to at least one of a plurality of segments forming the episode, the prestored-segment metadata including first-segment-type data and second-segment-type data; and
  replacing at least a portion of the prestored-segment metadata with any one of (i) personalized first-segment-type data, (ii) personalized second-segment-type data, or (iii) both (i) and (ii).

6. The method according to claim 1, further comprising the steps of:
  wherein the prestored-segment metadata corresponds to at least one of the plurality of segments forming the episode, the prestored-segment metadata including first-segment-type data and second-segment-type data, the first-segment-type data including:
    a first-segment identifier for retrieving the corresponding media content item,
    a start position corresponding to a beginning of the segment, and
    a stop position corresponding to an end of the segment,
  the second-segment-type data including:
    a second-segment identifier,
    a first source identifier corresponding to the second-segment identifier and indicating a first source of media content from which to retrieve a media content item, and
    an item number indicator indicating a number of media content items to retrieve from the first source of media content; and
  replacing any one of (i) the first-segment-type data with personalized first-segment-type data, (ii) the second-segment-type data with personalized second-segment-type data, or (iii) a combination thereof.

7. The method according to claim 1, further comprising the steps of:
  generating a notification indicating a media content item identified in the personalized-episode metadata has changed; and
  communicating the notification to the client device.

8. A system for performing personalization, comprising:
  a segments reader executed on one or more processors, wherein the segments reader includes instructions stored in non-transitory memory, the instructions, when executed, cause the one or more processors to:
    receive, from a client device, a request for episode metadata corresponding to an episode;
    retrieve, from a segments database, prestored-segment metadata corresponding to at least one of a plurality of segments forming the episode, the prestored-segment metadata including an instruction to personalize at least one segment of the prestored-segment metadata;
    cause a personalization service to determine whether the episode metadata should be personalized to an account associated with the request based on the instruction;
    retrieve personalized-episode metadata associated with the account and the request;
    provide the personalized-episode metadata to the client device associated with the request;
    receive, from the client device, either:
      a request to update one or more segments of the episode, or
      a request to maintain previously personalized episode metadata corresponding to one or more segments of the episode;
    in response to the request to update on or more segments of the episode:
      receive, from a recommendation system, updated segment metadata, and
      replace the one or more segments of the episode with the updated segment metadata; and
    in response to the request maintain previously personalized episode metadata, maintain the previously personalized episode metadata for the one or more segments of the episode.

9. The system according to claim 8, the segments reader further operable to:
  determine a personalized-segments database contains personalized-segment metadata corresponding to the request; and
  inject the personalized-segment metadata into the personalized-episode metadata by replacing at least a portion of the prestored-segment metadata with the personalized-segment metadata.

10. The system according to claim 8, the segments reader further operable to:

cause a personalization service to determine whether a personalized-segments database does not contain personalized-segment metadata;

obtain, from a recommendation system, personalized-segment metadata;

inject the personalized-segment metadata into the personalized-episode metadata by replacing at least a portion of the prestored-segment metadata with the personalized-segment metadata; and store the personalized-segment metadata in the personalized-segments database.

11. The system according to claim 8, the segments reader further including instructions stored in non-transitory memory that, when executed, cause the one or more processors to:

generate personalized-episode metadata containing segment metadata, the segment metadata including first-segment-type data and second-segment-type data, and wherein any one of (i) the first-segment-type data, (ii) the second-segment-type data, or (iii) both (i) and (ii) are personalized to the account associated with the request.

12. The system according to claim 8, the segments reader further including instructions stored in non-transitory memory that, when executed, cause the one or more processors:

wherein the prestored-segment metadata corresponds to at least one of a plurality of segments forming the episode, the prestored-segment metadata including first-segment-type data and second-segment-type data; and replacing at least a portion of the prestored-segment metadata with any one of (i) personalized first-segment-type data, (ii) personalized second-segment-type data, or (iii) both (i) and (ii).

13. The system according to claim 8, the segments reader further including instructions stored in non-transitory memory that, when executed, cause the one or more processors to:

wherein the prestored-segment metadata corresponds to at least one of the plurality of segments forming the episode, the prestored-segment metadata including first-segment-type data and second-segment-type data, the first-segment-type data including:
a first-segment identifier for retrieving the corresponding media content item,
a start position corresponding to a beginning of the segment, and
a stop position corresponding to an end of the segment, the second-segment-type data including:
a second-segment identifier,
a first source identifier corresponding to the second-segment identifier and indicating a first source of media content from which to retrieve a media content item, and
an item number indicator indicating a number of media content items to retrieve from the first source of media content; and replace any one of (i) the first-segment-type data with personalized first-segment-type data, (ii) the second-segment-type data with personalized second-segment-type data, or (iii) a combination thereof.

14. The system according to claim 8, the segments reader further including instructions stored in non-transitory memory that, when executed, cause the one or more processors to:

generate a notification indicating a media content item identified in the personalized-episode metadata has changed; and communicate the notification to the client device.

15. A non-transitory computer-readable medium having stored thereon one or more sequences of instructions for causing one or more processors to perform:

receiving, from a client device, a request for episode metadata corresponding to an episode;

retrieving, from a segments database, prestored-segment metadata corresponding to at least one of a plurality of segments forming the episode, the prestored-segment metadata including an instruction to personalize at least one segment of the prestored-segment metadata;

determining the episode metadata should be personalized to an account associated with the request based on the instruction;

retrieving personalized-episode metadata associated with the account and the request;

providing the personalized-episode metadata to the client device associated with the request;

receiving, from the client device, either:
a request to update one or more segments of the episode, or
a request to maintain previously personalized episode metadata corresponding to one or more segments of the episode;

in response to the request to update one or more segments of the episode:
receiving, from a recommendation system, updated segment metadata, and
replacing the one or more segments of the episode with the updated segment metadata; and in response to the request maintain previously personalized episode metadata, maintaining the previously personalized episode metadata for the one or more segments of the episode.

16. The non-transitory computer-readable medium of claim 15, further having stored thereon a sequence of instructions for causing the one or more processors to perform:

determining a personalized-segments database contains personalized-segment metadata corresponding to the request; and injecting the personalized-segment metadata into the personalized-episode metadata by replacing at least a portion of the prestored-segment metadata with the personalized-segment metadata.

17. The non-transitory computer-readable medium of claim 15, further having stored thereon a sequence of instructions for causing the one or more processors to perform:

determining a personalized-segments database does not contain personalized-segment metadata;

obtaining, from a recommendation system, personalized-segment metadata;

injecting the personalized-segment metadata into the personalized-episode metadata by replacing at least a portion of the prestored-segment metadata with the personalized-segment metadata; and storing the personalized-segment metadata in the personalized-segments database.

18. The non-transitory computer-readable medium of claim 15, further having stored thereon a sequence of instructions for causing the one or more processors to perform:

generating personalized-episode metadata containing segment metadata, the segment metadata including first-segment-type data and second-segment-type data, and wherein any one of (i) the first-segment-type data, (ii) the second-segment-type data, or (iii) both (i) and (ii) are personalized to the account associated with the request.

19. The non-transitory computer-readable medium of claim 15, further having stored thereon a sequence of instructions for causing the one or more processors to perform:
   wherein the prestored-segment metadata corresponds to at least one of a plurality of segments forming the episode, the prestored-segment metadata including first-segment-type data and second-segment-type data; and
   replacing at least a portion of the prestored-segment metadata with any one of (i) personalized first-segment-type data, (ii) personalized second-segment-type data, or (iii) both (i) and (ii).

20. The non-transitory computer-readable medium of claim 15, further having stored thereon a sequence of instructions for causing the one or more processors to perform:
   wherein the prestored-segment metadata corresponds to at least one of the plurality of segments forming the episode, the prestored-segment metadata including first-segment-type data and second-segment-type data, the first-segment-type data including:
      a first-segment identifier for retrieving the corresponding media content item,
      a start position corresponding to a beginning of the segment, and
      a stop position corresponding to an end of the segment,
   the second-segment-type data including:
      a second-segment identifier,
      a first source identifier corresponding to the second-segment identifier and indicating a first source of media content from which to retrieve a media content item, and
      an item number indicator indicating a number of media content items to retrieve from the first source of media content; and
   replacing any one of (i) the first-segment-type data with personalized first-segment-type data, (ii) the second-segment-type data with personalized second-segment-type data, or (iii) a combination thereof.

21. The non-transitory computer-readable medium of claim 15, further having stored thereon a sequence of instructions for causing the one or more processors to perform:
   generating a notification indicating a media content item identified in the personalized-episode metadata has changed; and
   communicating the notification to the client device.

* * * * *